United States Patent [19]

Lungershausen et al.

[11] Patent Number: 5,258,863
[45] Date of Patent: Nov. 2, 1993

[54] METHOD FOR EFFECTING ILLUMINATION OF AN ARBITRARY APERTURE

[75] Inventors: Arnold W. Lungershausen, West Henrietta; Stephen C. Arnold, Honeoye Falls, both of N.Y.

[73] Assignee: Eastman Kodak Company, Rochester, N.Y.

[21] Appl. No.: 839,416

[22] Filed: Feb. 21, 1992

[51] Int. Cl.$^5$ ............................ G02B 5/32; G03H 1/30
[52] U.S. Cl. ............................... 359/20; 359/27; 359/28; 359/30
[58] Field of Search ..................... 359/20, 25, 28, 30, 359/31, 10, 11, 27

[56] References Cited

U.S. PATENT DOCUMENTS

| | | | |
|---|---|---|---|
| 3,674,331 | 7/1972 | Caulfield | 359/28 |
| 3,677,616 | 7/1972 | Lewis | 359/28 |
| 3,689,129 | 9/1972 | Lurie | 359/28 |
| 3,692,380 | 9/1972 | Inagaki | 359/28 |
| 3,752,555 | 8/1973 | Klotz | 359/25 |
| 3,756,684 | 9/1973 | Fox | 359/28 |
| 3,785,736 | 1/1974 | Spitz et al. | 359/20 |
| 3,909,111 | 9/1975 | Meyerhofer | 359/28 |
| 3,941,450 | 3/1976 | Spitz et al. | |
| 4,130,338 | 12/1978 | Clay et al. | 359/28 |

*Primary Examiner*—Martin Lerner
*Attorney, Agent, or Firm*—Kevin A. Sembrat

[57] ABSTRACT

The present invention discloses a novel method for effecting illumination of an arbitrary aperture. The method comprises a first step of providing a developed hologram comprising a plurality of spatially known discrete holographic optical elements that have been generated from a common arbitrary aperture. A second step comprises directing a plurality of dedicated reconstructing beams to assigned ones of the holographic optical elements, so that a composite hologram beam illuminates the arbitrary aperture.

4 Claims, 3 Drawing Sheets

METHOD FOR EFFECTING ILLUMINATION OF AN ARBITRARY APERTURE

BACKGROUND OF THE INVENTION

The invention relates to a method for effecting illumination of an arbitrary aperture.

INTRODUCTION TO THE INVENTION

One important situation that requires a method for effecting illumination of an arbitrary aperture, is the following.

Consider a detector array comprising a conventional image sensor, for example, a charge coupled device (CCD). Here, the arbitrary aperture includes a scene to be imaged onto the CCD, typically by way of an intermediate imaging lens.

In order to achieve a desired image detection rate, it is necessary to ensure that a signal level is sufficiently greater than a combination of inherent detector noise and a signal-generated noise, i.e., that a signal to noise ratio (SNR) is adequate. For a given image detection rate, this may be accomplished by ensuring that an illumination level within the imaged aperture exceeds a threshold of acceptable SNR.

SUMMARY OF THE INVENTION

We have noted, firstly, that present commercially available CCD detector arrays are being driven to ever increasing data rates. Ever increasing data rates require, however, either a concomittant ever enhanced array sensitivity and noise characteristic, or an ever increased illumination level exceeding the threshold of acceptable SNR. We have noted, secondly, that a required enhancement of array sensitivity and noise characteristic has not kept pace with the increase of data rates.

Accordingly, in order to attain higher image detection rates, the illumination levels within the imaged apertures must be increased in order to exceed the threshold of an acceptable SNR.

We now disclose a novel method for effecting a requisite illumination of an arbitrary aperture. To this end, the novel method incorporates holographic recording and reconstructing techniques.

In particular, the novel method, in a first aspect, comprises a subsumed holographic recording method comprising the steps of:

1) providing an optical mask comprising a scattering medium defining at least one aperture that is congruent with an external arbitrary aperture; and 2) (i) directing a reference beam to a light sensitive recording medium; and (ii) simultaneously directing an input-object beam to the light sensitive recording medium by way of the optical mask, thereby constructing an interference hologram comprising a plurality of discrete holographic optical elements.

In a second aspect, the present invention discloses a novel method for effecting illumination of an arbitrary aperture, comprising the steps of:

1) providing a developed hologram comprising a plurality of spatially known discrete holographic optical elements that have been generated from a common arbitrary aperture; and 2) directing a plurality of dedicated reconstructing beams to assigned ones of the holographic optical elements, so that a composite hologram beam illuminates the arbitrary aperture.

BRIEF DESCRIPTION OF THE DRAWING

The invention is illustrated in the accompanying drawings in which.

DETAILED DESCRIPTION OF THE INVENTION

Figure 1:
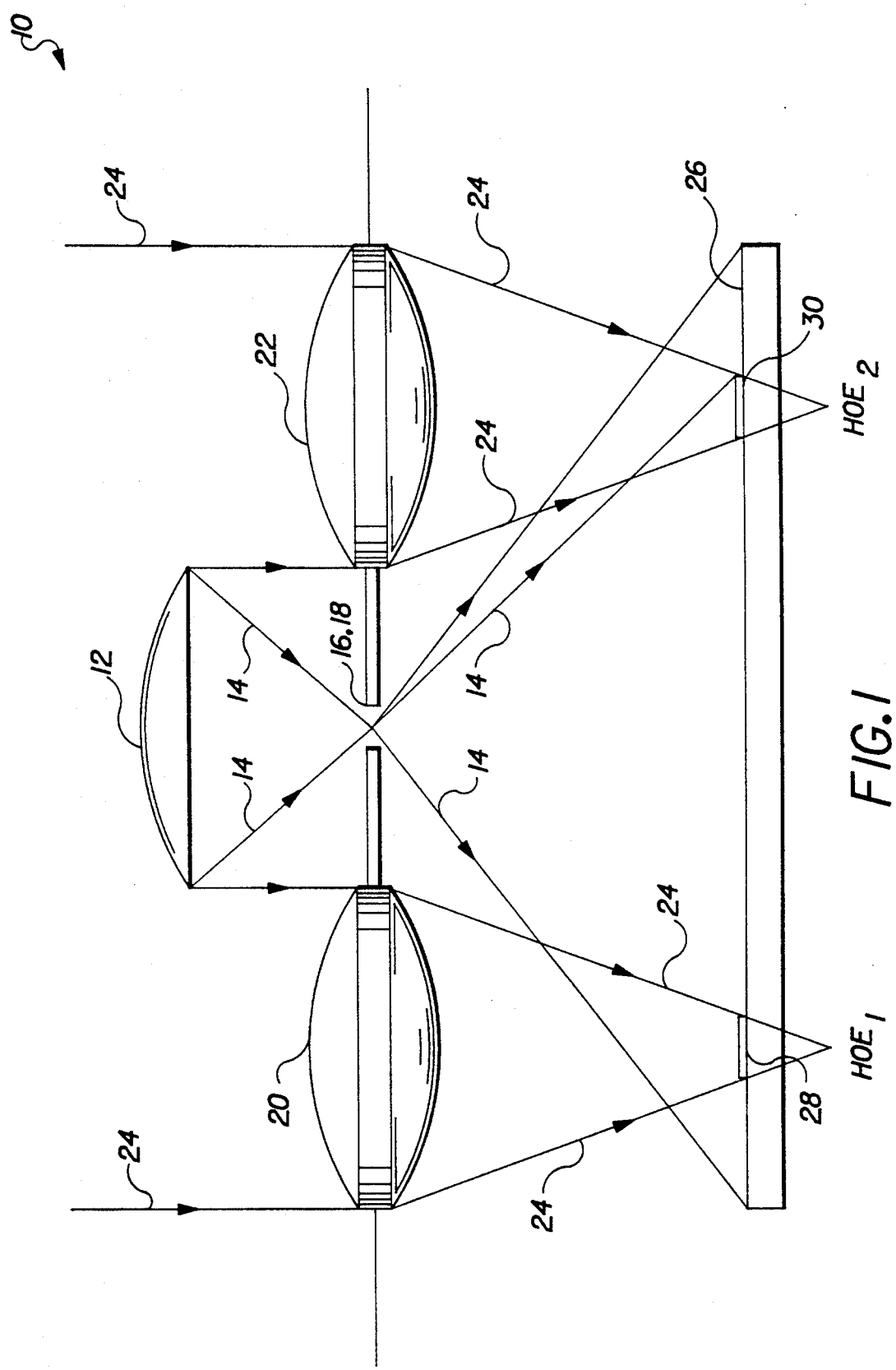
FIG. 1 shows a schematic of a holographic recording assembly that may be used to realize the first aspect of the method of the present invention.
Figure 2:
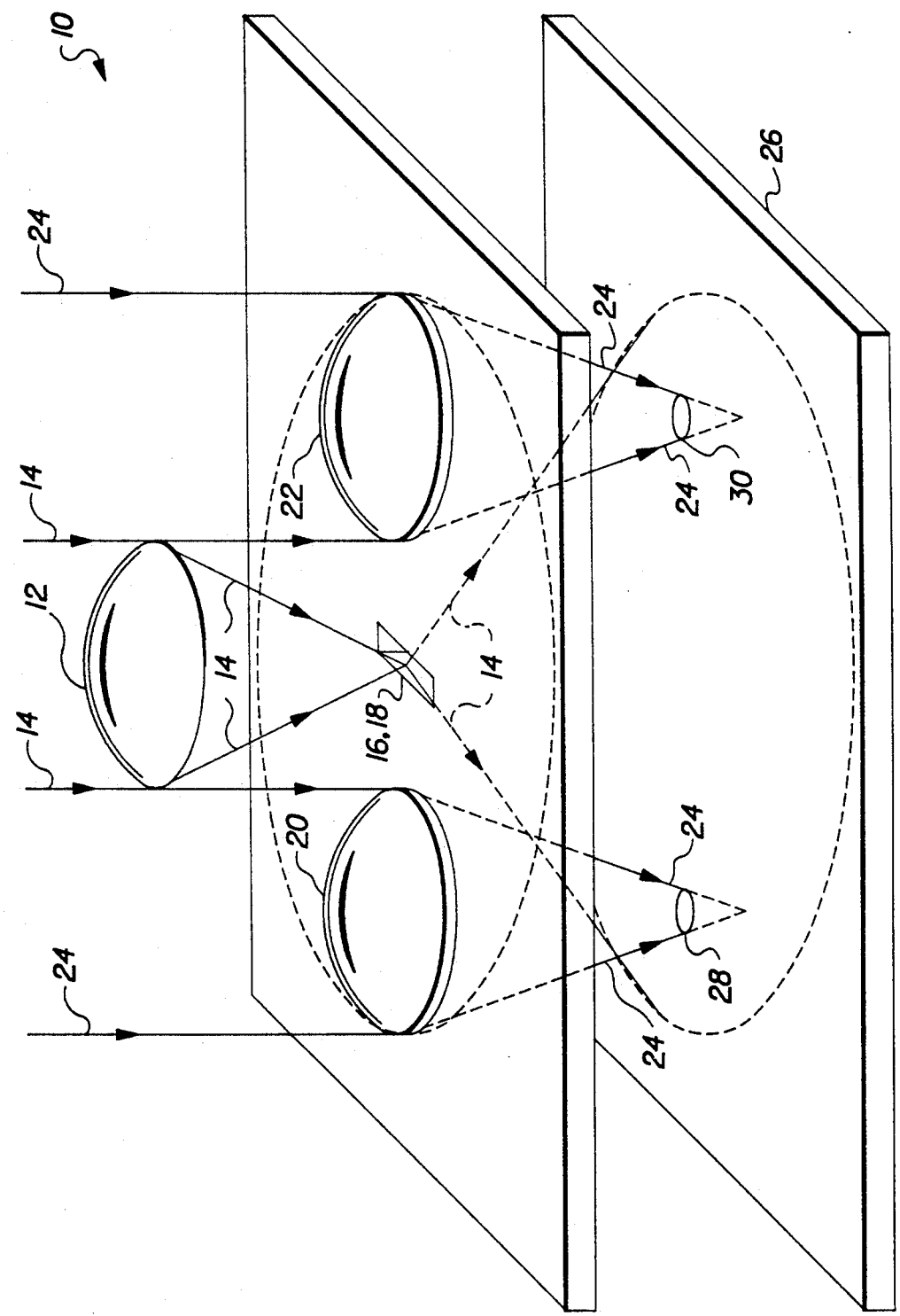
FIG. 2 shows an isometric view of the FIG. 1 recording assembly.

The method of the invention in its first aspect is preferably realized by way of a holographic recording assembly of a type shown in FIGS. 1 and 2, as assembly 10.

The recording assembly 10 preferably comprises a conventional lens 12, preferably geometrically centered to collect and direct an appropriate amount of laser radiation, emanating from an input or object beam 14, to a diffuser 16.

The diffuser 16 comprises an optical mask comprising a scattering medium, for example, a ground glass. The diffuser 16 is masked coincident or congruent with a desired arbitrary aperture 18, in this case, a long narrow slit. The slit, in typical applications, has an aspect ratio of at least 100 to 1, in particular, an aspect ratio of at least 1000 to 1, for example, an aspect ratio of 1300 to 1.

FIGS. 1 and 2 further show an array of conventional lenses 20, 22 that can function, in a well known way, to collect and focus a reference beam 24 onto a conventional sensitized plate 26. Note that the array of lenses 20, 22 preferably comprises optical properties appropriate to a beam shape and aperture of final reconstructing input beams, in this case (as shown in FIG. 3, infra), a number of laser diodes with divergent beams of elliptical cross-section.

The operation of the FIGS. 1 and 2 holographic recording assembly 10, is as follows.

The sensitized plate 26 is preferably placed between the lens array (12, 20, 22) and their focal planes, such that the radiation 14 from all of the diffusely illuminated aperture 18 illuminates the sensitized plate 26. This illumination, in turn, interferes with the reference beam 24, thereby constructing an interference hologram comprising a plurality (here, two) of discrete holographic optical elements 28, 30.

Figure 3:
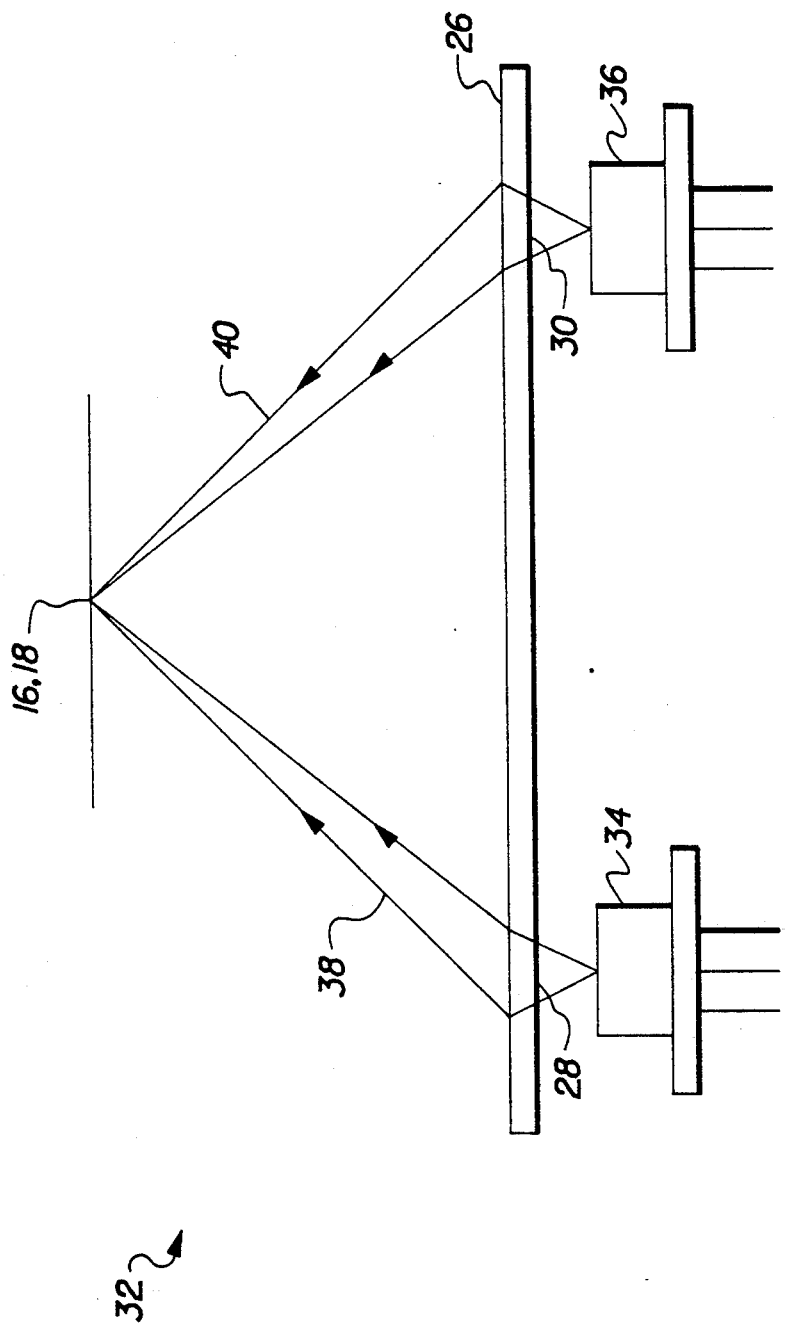
FIG. 3 shows a schematic of a holographic reconstructing assembly that may be used to realize the second aspect of the method of the present invention.

Attention is now directed to FIG. 3, which shows a holographic reconstructing assembly 32 that is preferably used to realize the second aspect of the method of the present invention.

The FIG. 3 reconstructing assembly 32 includes the FIGS. 1 and 2 sensitized plate 26 which, in turn, comprises the now developed interference hologram comprising the discrete holographic optical elements 28, 30.

The FIG. 3 reconstructing assembly 32 includes a plurality (here, two) of conventional laser diodes 34, 36. Each laser is "assigned" (i.e., positioned) to one of the holographic optical elements 28, 30. Restated, each laser is positioned at a point previously defined by a FIG. 1 recording focused beam location.

The FIG. 3 reconstructing assembly 32 shows that laser beams 38, 40 that exit from the holographic optical elements (28, 30), are directed toward the arbitrary aperture 18. Note, in this context, that since each point in the hologram was recorded through illumination by the reference (converging) beam and the object beam(s) emanating from each point defined by the arbitrary aperture, each point in the arbitrary aperture is now illuminated more or less uniformly by the radiation diffracted by the hologram. This action occurs at each and every holographic optical element. Accordingly, the arbitrary aperture 18 is nearly uniformly illuminated, and very efficiently by each laser source.

Note that the level of radiation, but not the distribution of radiation in the arbitrary aperture, is dependent on the number of lasers used, as well as their power output.

Note, preferably, that the superposition of the plurality of lasers is such that the outputs at the arbitrary aperture possess no temporal coherence with respect to each other, and "average" a speckle pattern generated by each discrete laser.

What is claimed:

1. A method for effecting illumination of an arbitrary aperture, the method comprising the steps of:
   1) providing a developed hologram comprising a plurality of spatially known discrete holographic optical elements, on a common substrate, that have been generated by radiation from a common diffusely transmitting arbitrary aperture and radiation from a plurality of reference beams; and
   2) directing a plurality of dedicated reconstructing beams to assigned ones of the holographic optical elements, whereby a composite reconstruction beam illuminates the arbitrary aperture.

2. A method for effecting illumination of an arbitrary aperture according to claim 1, wherein step 1) comprises:
   providing a developed hologram that has been generated from a common arbitrary aperture having an aspect ratio of at least 100 to 1.

3. A method for effecting illumination of an arbitrary aperture according to claim 1, wherein step 1) comprises:
   providing a developed hologram that has been generated from a common arbitrary aperture having an aspect ratio of at least 1000 to 1.

4. A method for effecting illumination of an arbitrary aperture according to claim 1, wherein step 2) comprises:
   superpositioning a plurality of mutually incoherent laser reconstructing beams so that the outputs at the arbitrary aperture possess no temporal coherence with respect to each other.

* * * * *